(12) United States Patent
Huang

(10) Patent No.: US 7,531,268 B2
(45) Date of Patent: May 12, 2009

(54) BATTERY LOCKING APPARATUS FOR ELECTRONIC DEVICE

(75) Inventor: Tie-An Huang, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1105 days.

(21) Appl. No.: 10/817,108

(22) Filed: Apr. 1, 2004

(65) Prior Publication Data

US 2004/0214077 A1 Oct. 28, 2004

(30) Foreign Application Priority Data

Apr. 25, 2003 (TW) .............................. 92206593 U

(51) Int. Cl.
*H01M 2/10* (2006.01)

(52) U.S. Cl. .......................................... 429/97; 429/96

(58) Field of Classification Search ................... 429/97, 429/96
See application file for complete search history.

(56) References Cited

U.S. PATENT DOCUMENTS 5,608,612 A * 3/1997 Hokao ........................ 361/814
5,716,730 A 2/1998 Deguchi
5,895,729 A * 4/1999 Phelps et al. ................... 429/97

* cited by examiner

*Primary Examiner*—Patrick Ryan
*Assistant Examiner*—Julian Mercado
(74) *Attorney, Agent, or Firm*—Wei Te Chung

(57) ABSTRACT

A locking apparatus for a battery (10) having locking portions (11) includes a base (20), a resilient member (85) secured to the base, and a first lock member (40). The resilient member includes a stop portion (86). The first lock member defines a first recess (43) and a second recess (42), and includes at least one post (51). The at least one post is engaged in the locking portions of the battery. The first lock member is slidable between a first position and a second position. When the first lock member is slid to the first position, the stop potion of the resilient member abuts the first lock member in the first recess to secure the battery to the base. When the first lock member is slid to the second position, the stop potion abuts the first lock member in the second recess to release the battery from the base.

19 Claims, 13 Drawing Sheets

US 7,531,268 B2

BATTERY LOCKING APPARATUS FOR ELECTRONIC DEVICE

BACKGROUND OF THE INVENTION

1. Field of the Invention

The present invention relates generally to battery locking apparatuses, and more particularly to a battery locking apparatus for an electronic device in which a battery is securely installed and easily removed thereto and therefrom.

2. Related Art

Presently, portable electronic devices such as notebook computers which are driven by batteries installed therein. Many battery locking apparatuses are designed to install and remove batteries to and from electronic devices.

U.S. Pat. No. 5,716,730 discloses a battery case mounting structure for a portable electronic equipment. A recessed portion is formed in the battery case. A locking projecting body is formed on a main body of an electronic equipment and inserted in the recessed portion to fix the battery case. A guide portion supports the locking projecting body to be projectable from or retractable into the recessed portion so that the battery case is attachable to or detachable from the main body. A spring mechanism constantly biases the locking projecting body to project. An operating portion slides the locking projecting body to retract against a biasing force of the spring mechanism. The battery case is mounted on a mounting portion of the electronic equipment, and the operating portion is released. The distal end of the locking projecting body is inserted in the recessed portion of the battery case by the force of the spring, thereby fixing the battery case. However, because the portable electronic devices are typically carried about and used at various locations, the locking projecting body can be easily moved or released due to vibration, impact or inadvertent operation.

SUMMARY OF THE INVENTION

Accordingly, an object of the present invention is to provide a battery locking apparatus for securely installing and easily removing a battery to and from an electronic device.

To achieve the above-mentioned object, a locking apparatus for a battery in accordance with a preferred embodiment of the present invention includes a base, a resilient member secured to the base, and a first lock member. The battery includes at least one locking portion. The resilient member includes a stop portion. The first lock member defines a first recess and a second recess, and includes at least one post. The at least one post is engaged in the at least locking portion of the battery. The first lock member is slidable between a first position and a second position. When the first lock member is slid to the first position, the stop potion of the resilient member abuts the first lock member in the first recess to secure the battery to the base. When the first lock member is slid to the second position, the stop potion of the resilient member abuts the first lock member in the second recess to release the battery from the base.

Other objects, advantages and novel features of the present invention will be drawn from the following detailed description of preferred embodiments of the present invention with the attached drawings, in which:

DESCRIPTION OF THE PREFERRED EMBODIMENTS

Figure 1:
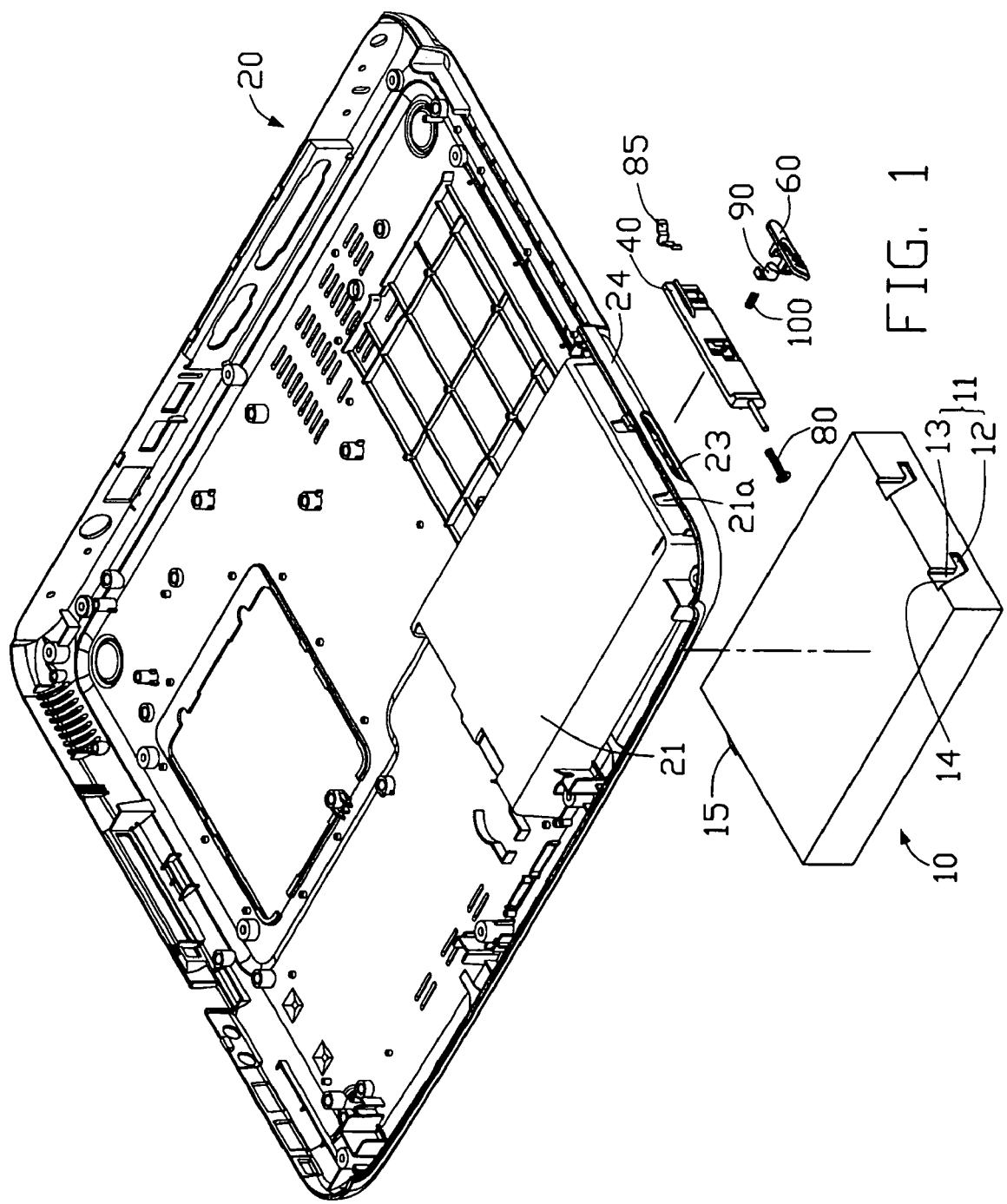
FIG. 1 is an exploded, isometric view of a battery locking apparatus for electronic device in accordance with the preferred embodiment of the present invention.

FIG. 1 shows a battery locking apparatus in accordance with the preferred embodiment of the present invention. The locking apparatus comprises a battery 10, a base 20, a first lock member 40, a second lock member 60, a first spring 80, a resilient member 85, a button 90, and a second spring 100.

The battery 10 defines a pair of spaced slots 11 in a front wall thereof. Each slot 11 comprises a vertical guide portion 13 and a horizontal lock portion 12. Each guide portion 13 is bounded by a slanted face 14. A projection 15 extends from a rear wall of the battery 10.

Figure 2:
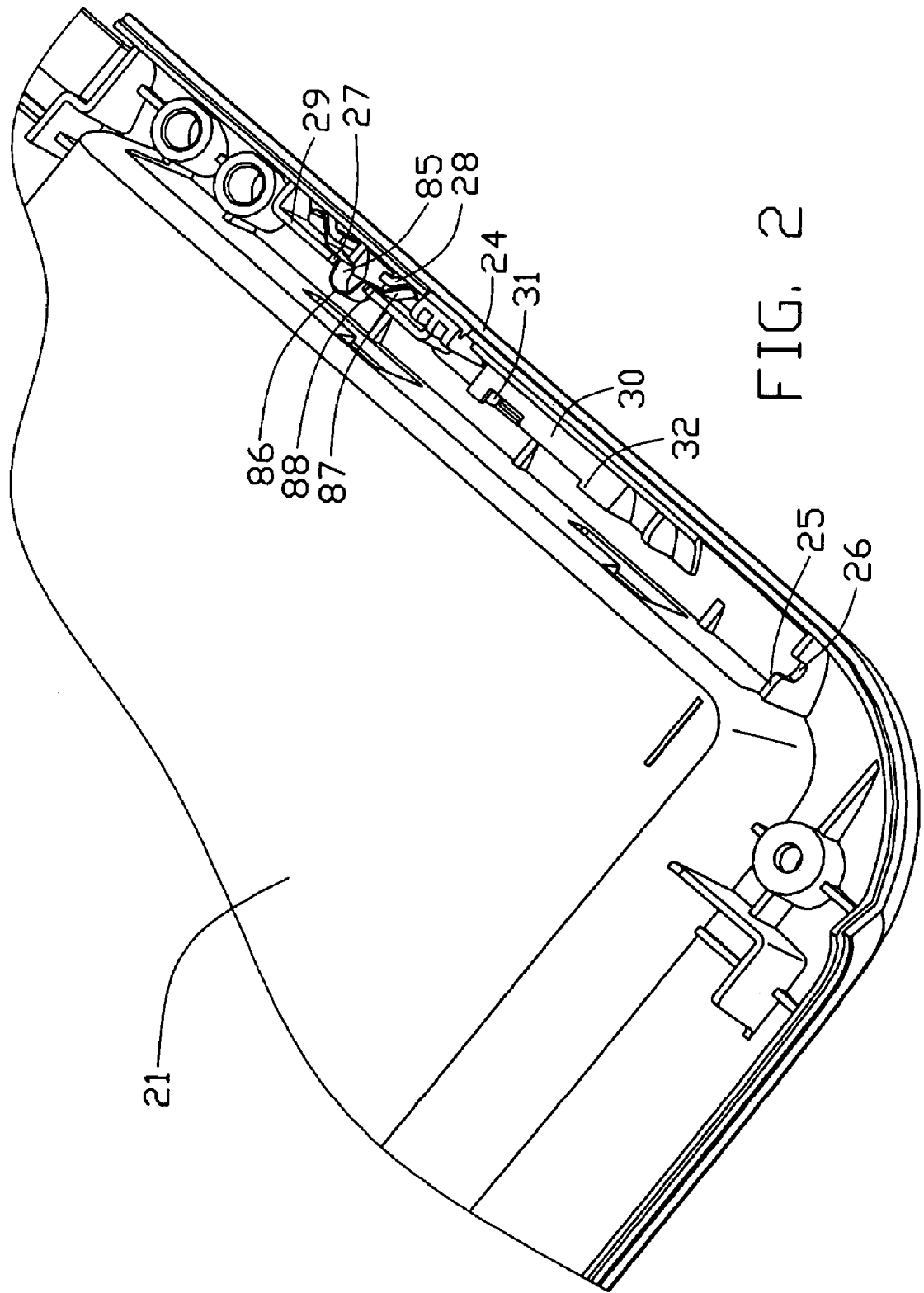
FIG. 2 is a partly, enlarged, isometric view of the locking apparatus of FIG. 1, showing a resilient member secured to a third plate.
Figure 3:
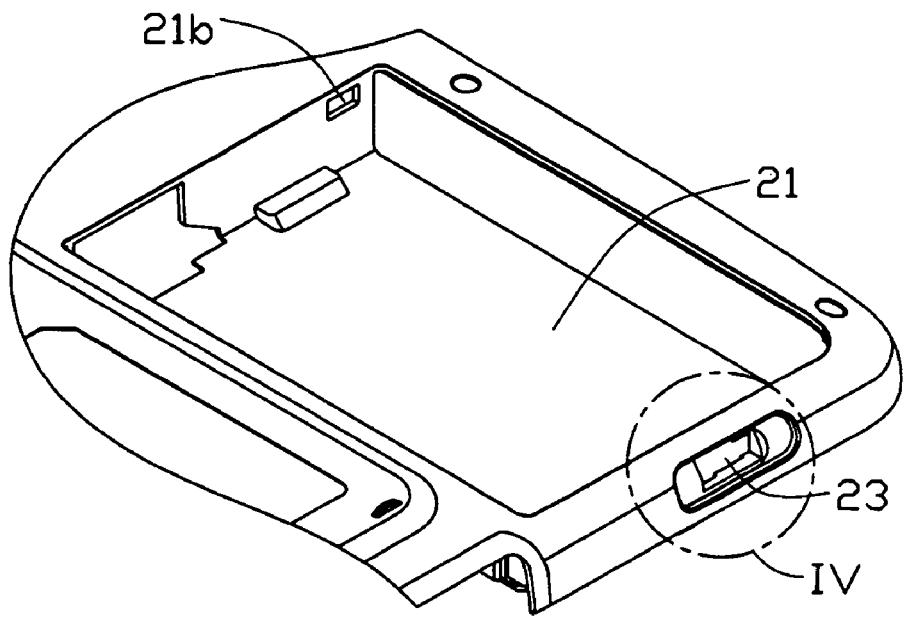
FIG. 3 is a partly, enlarged, isometric view of the locking apparatus of FIG. 1, showing a battery compartment.
Figure 4:
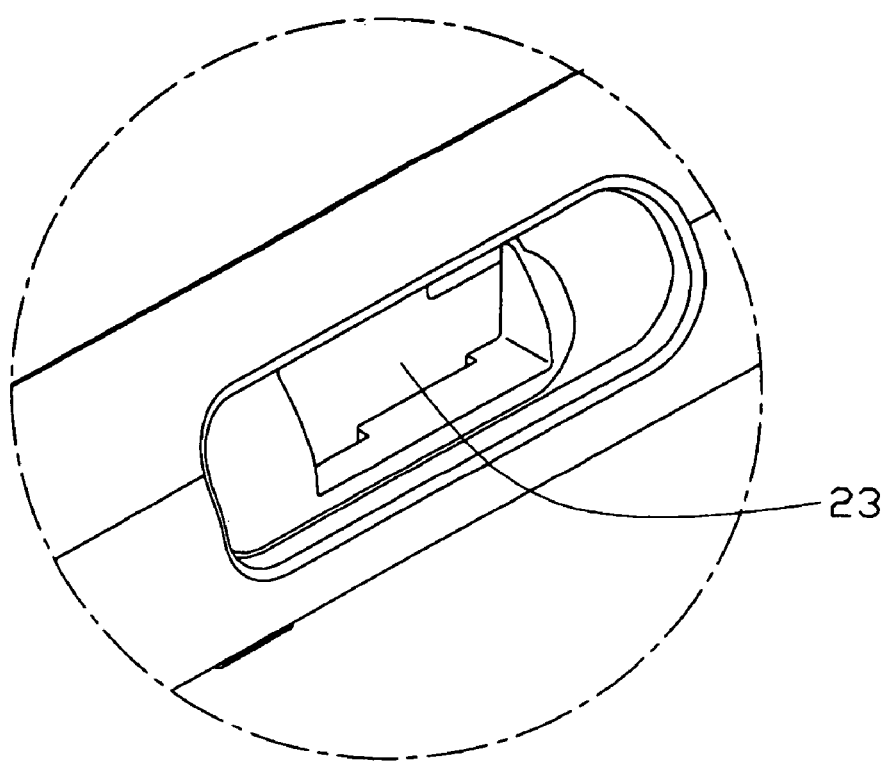
FIG. 4 is an enlarged view of a circled portion IV of FIG. 3.

Referring also to FIGS. 2-4, the base 20 comprises a peripheral flange 24. A battery compartment 21 is disposed adjacent the flange 24, for accommodating the battery 10 therein. The battery compartment 21 defines a pair of spaced first through holes 21a in a front wall thereof adjacent the flange 24, and a second through hole 21b in a rear wall thereof for receiving the projection 15 of the battery 10 therein. The flange 24 defines an opening 23 therein between the first through holes 21a. A first plate 25 substantially interconnects the front wall of the battery compartment 21 and the flange 24. The first plate 25 defines a U-shaped first cutout 26 therein. A second plate 30 extends rearwardly from the flange 24 at an upper extremity of the opening 23. The second plate 30 comprises a stop portion 32 at one end thereof, and defines a second cutout 31 in an opposite end thereof. A generally U-shaped third plate 29 extends rearwardly from the flange 24 adjacent the second plate 30. The third plate 29 defines a third cutout 27 in a center portion thereof. A pair of spaced fixing tabs 28 extends from the flange 24, and is disposed between the flange 24 and the third plate 29.

The resilient member 85 has a symmetrical configuration, and comprises a central generally semi-circular stop portion 86. The stop portion 86 is extended through the third cutout 27 of the third plate 29 of the base 20. A pair of shoulders 88 extends from opposite ends of the stop portion 86 respectively. The shoulders 88 abut a main face of the third plate 29. A pair of slanted wings 87 extends from distal ends of the shoulders 88 respectively. The wings 87 abut respective fixing tabs 28 of the base 20.

Figure 5:
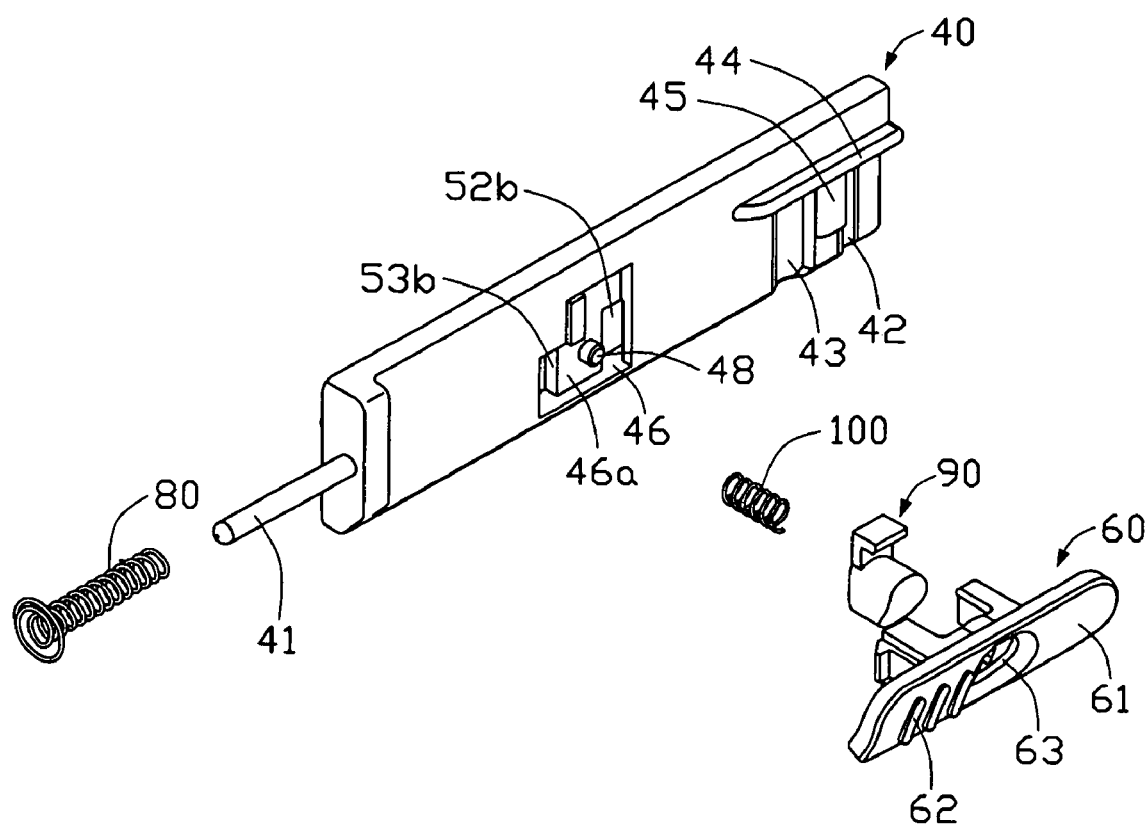
FIG. 5 is an exploded, isometric view of a first lock member and a second lock member of FIG. 1, together with a first spring, a second spring and a button.
Figure 6:
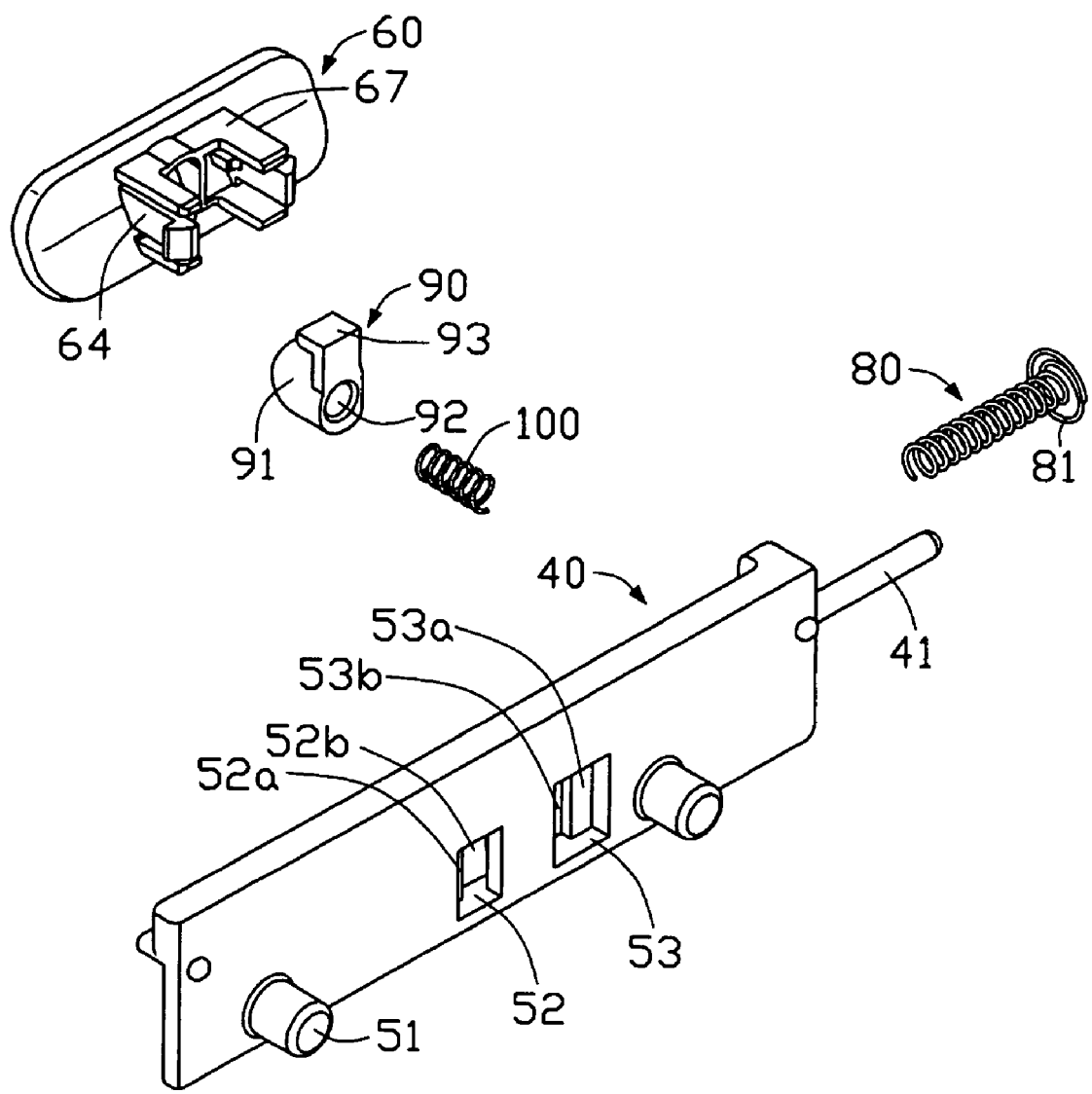
FIG. 6 is similar to FIG. 5, but viewed from another aspect.

Referring to FIGS. 5-6, the first lock member 40 has an elongate configuration. A pin 41 extends from an end of the first lock member 40, for extending through the first spring 80 and the first cutout 26 of the first plate 25 of the base 20. The first lock member 40 defines an L-shaped first hole 46 in one side of a center portion thereof. The first hole 46 is bounded by a first bottom 46a. A first post 48 protrudes from the first bottom 46a, for inserting in the second spring 100. The first lock member 40 also defines a first recess 43 and an adjacent second recess 42 in an end thereof opposite from the pin 41. The first and second recesses 43, 42 each have arcuate cross-sections. A protrusion 45 having an arcuate cross-section is disposed between the first and second recesses 43, 42. The stop portion 86 of the resilient member 85 is resiliently engaged in the first recess 43 or the second recess 42, according to whether the battery 10 is installed in or removed from the battery compartment 21. A horizontal stop bar 44 is disposed above the first and second recesses 43, 42, for preventing the stop portion 86 from being upwardly displaced. The first lock member 40 further defines a second hole 52 and an adjacent third hole 53 in an opposite side of the center portion thereof. The second hole 52 is bounded by a second bottom 52a. The third hole 53 is bounded by a third bottom 53a. A first gap 52b and a second gap 53b are defined in the center portion of the first lock member 40, and span between the first bottom 46a and the second and third bottoms 52a, 53a respectively. A pair of spaced second posts 51 projects from the first lock member 40 at opposite sides of the second and third holes 52, 53 respectively, for being extended through the first through holes 21a of the battery compartment 21 of the base 20 and being engagingly secured in the lock portions 12 of the battery 10.

The first spring 80 comprises an enlarged portion 81 at an end thereof. The enlarged portion 81 abuts an inner face of the first plate 25 of the base 20, and an opposite end of the first spring 80 abuts an end of the first lock member 40.

The second lock member 60 comprises a front panel 61, and a plurality of parallel ribs 62 arranged thereon for facilitating manual manipulation. A through hole 63 is defined in a center portion of the second lock member 60. A pair of longitudinally disposed spaced latches 64 extends rearwardly from a rear side of the front panel 61. A pair of spaced horizontal forks 67 extends rearwardly from the rear side of the front panel 61 above and below the latches 64 respectively, substantially sandwiching the latches 64 therebetween. The latches 64 and the forks 67 are extended through the first and second gaps 52b, 53b of the first lock member 40 respectively, such that the latches 64 snappingly engage with the second and third bottoms 52a, 53a of the first lock member 40.

The button 90 comprises a cylindrical main body 91. The main body 91 defines a countersink 92 in a rear end thereof, for receiving the second spring 100 therein. An L-shaped arm 93 perpendicularly extends from the rear end of the main body 91, with an end of the arm 93 pointing forward.

Figure 7:
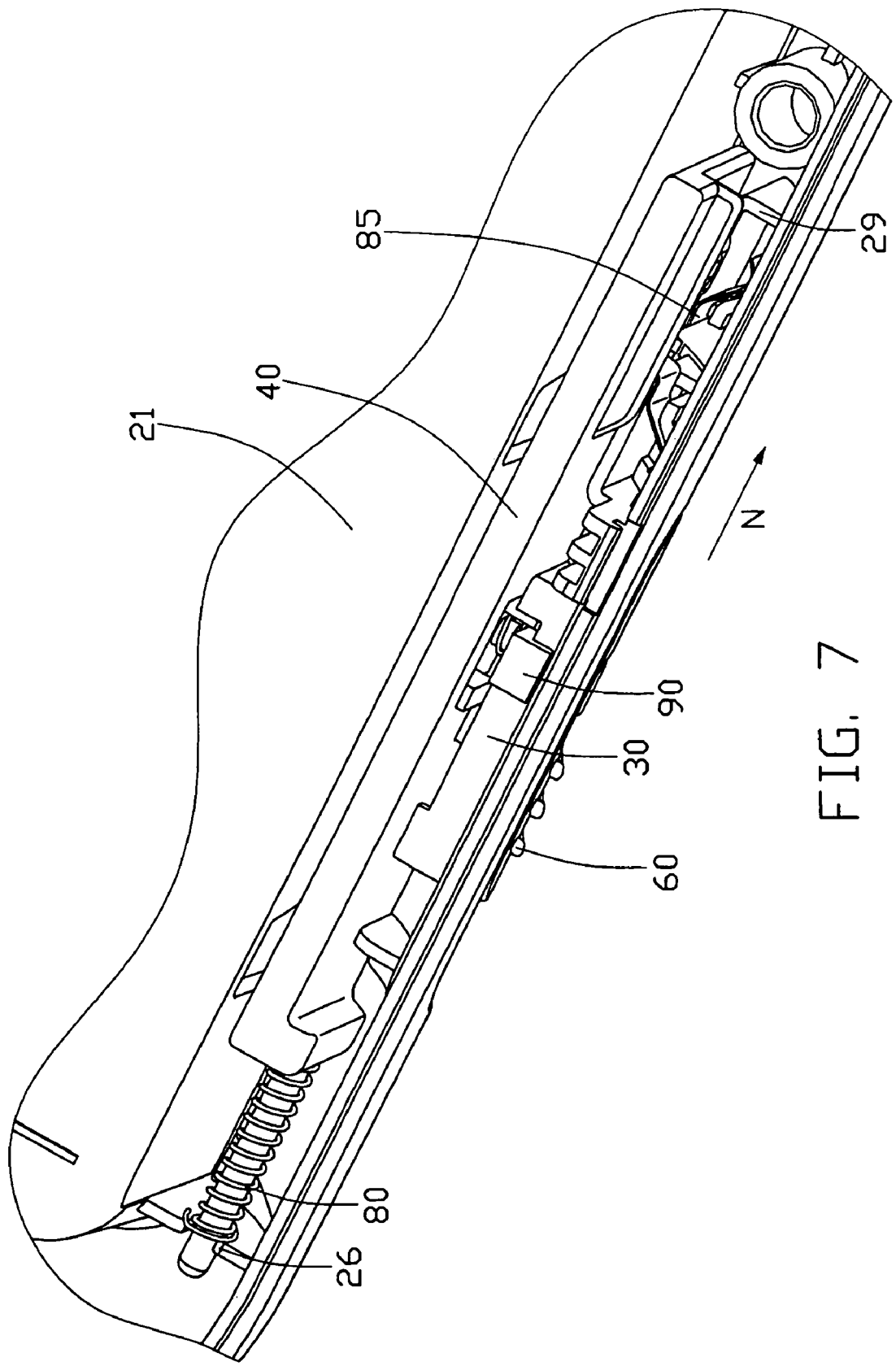
FIG. 7 is a partly view of the fully assembled view of FIG. 1, showing the locking apparatus when a battery is installed.
Figure 8:
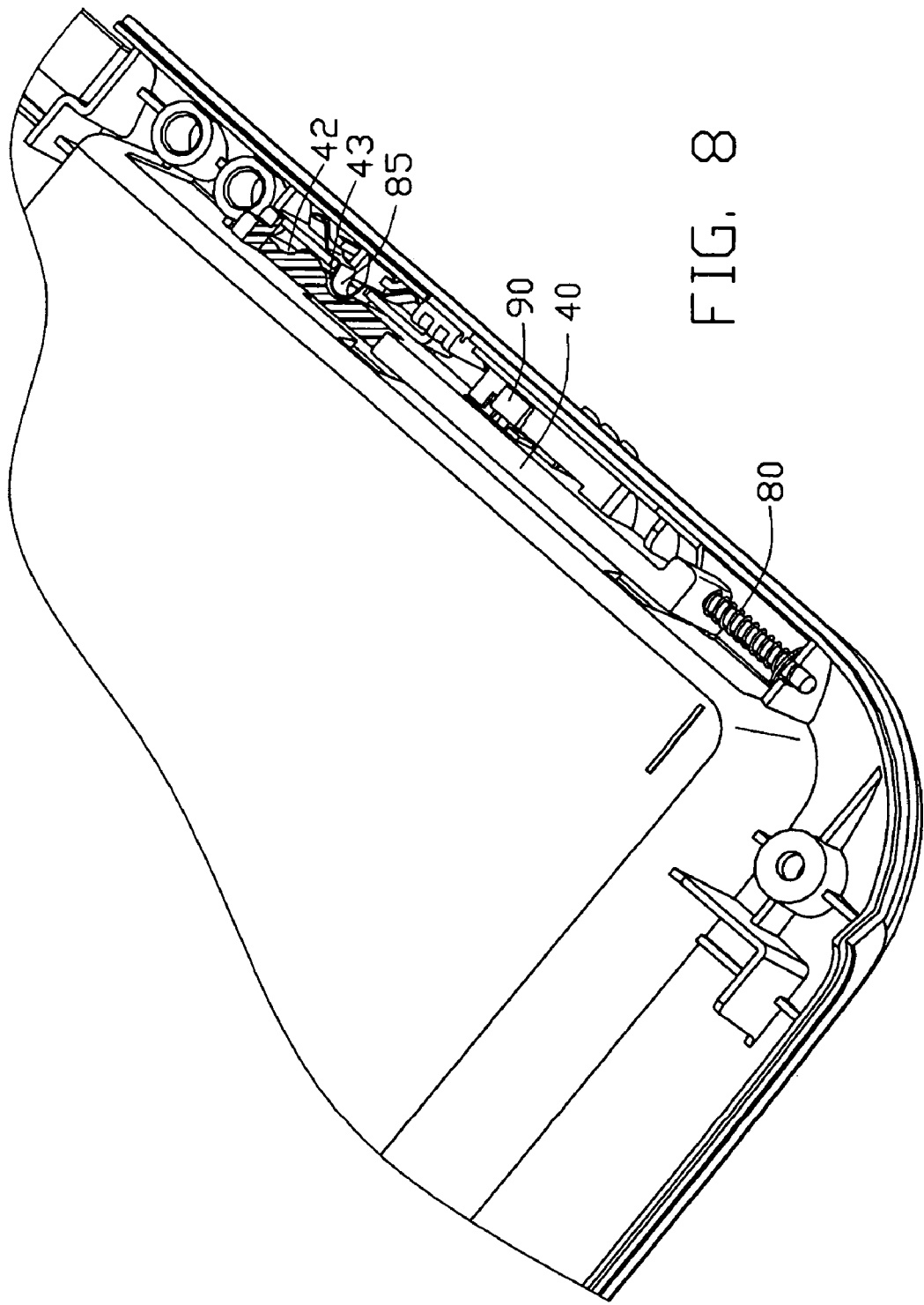
FIG. 8 is a partly sectional view of FIG. 7, but viewed from another aspect.

Referring to FIGS. 7-8, in assembly, the resilient member 85 is secured to the third plate 29 of the base 20. The stop portion 86 extends through the third cutout 27 of the third plate 29, the shoulders 88 abut the main face of the third plate 29, and the wings 87 abut the fixing tabs 28 of the base 20. The main body 91 of the button 90 is extended through the opening 23 of the base 20, and the arm 93 of the button 90 catches the second plate 30 of the base 20 so that the button 90 is suspended therefrom. The second spring 100 is received in the countersink 92 of the main body 91. The first spring 80 is attached to the pin 41 of the first lock member 40. The combined first spring 80 and first lock member 40 is secured to the base 20. The second posts 51 of the first lock member 40 are received in the first through holes 21a of the battery compartment 21. The pin 41 is received in the first cutout 26, and the enlarged portion 81 of the first spring 80 abuts the inner face of the first plate 25. The first post 48 is inserted in the second spring 100. The stop portion 86 of the resilient member 85 engages in the second recess 42 of the first lock member 40, with an upper part of the stop portion 86 abutting the stop bar 44. The second lock member 60 is attached to the first lock member 40. The latches 64 and the forks 67 of the second lock member 60 are inserted through the first and second gaps 52b, 53b respectively, with the latches 64 snappingly engaging with the second and third bottoms 52a, 53a. Simultaneously, the main body 91 of the button 90 extends through the through hole 63 of the second lock member 60.

When the battery 10 is installed in the battery compartment 21, the projection 15 of the battery 10 is inserted in the second through hole 21b of the battery compartment 21, and the second posts 51 of the first lock member 40 abut the slanted faces 14 of the guide portions 13 of the slots 11. The battery 10 is pressed upwardly, and the second posts 51 slide along the slanted faces 14. Accordingly, the combined first lock member 40, second lock member 60 and button 90 is moved in direction N until the stop portion 86 of the resilient member 85 rides over the protrusion 45 of the first lock member 40 to engage in the first recess 43, so that the first lock member 40 is in a locked position. Simultaneously, the arm 93 of the button 90 is engagingly received in the second cutout 31 of the second plate 30 of the base 20, and the second posts 51 are received in the lock portions 12 of the slots 11 of the battery 10. Thus the battery 10 is secured in the base 20.

Figure 9:
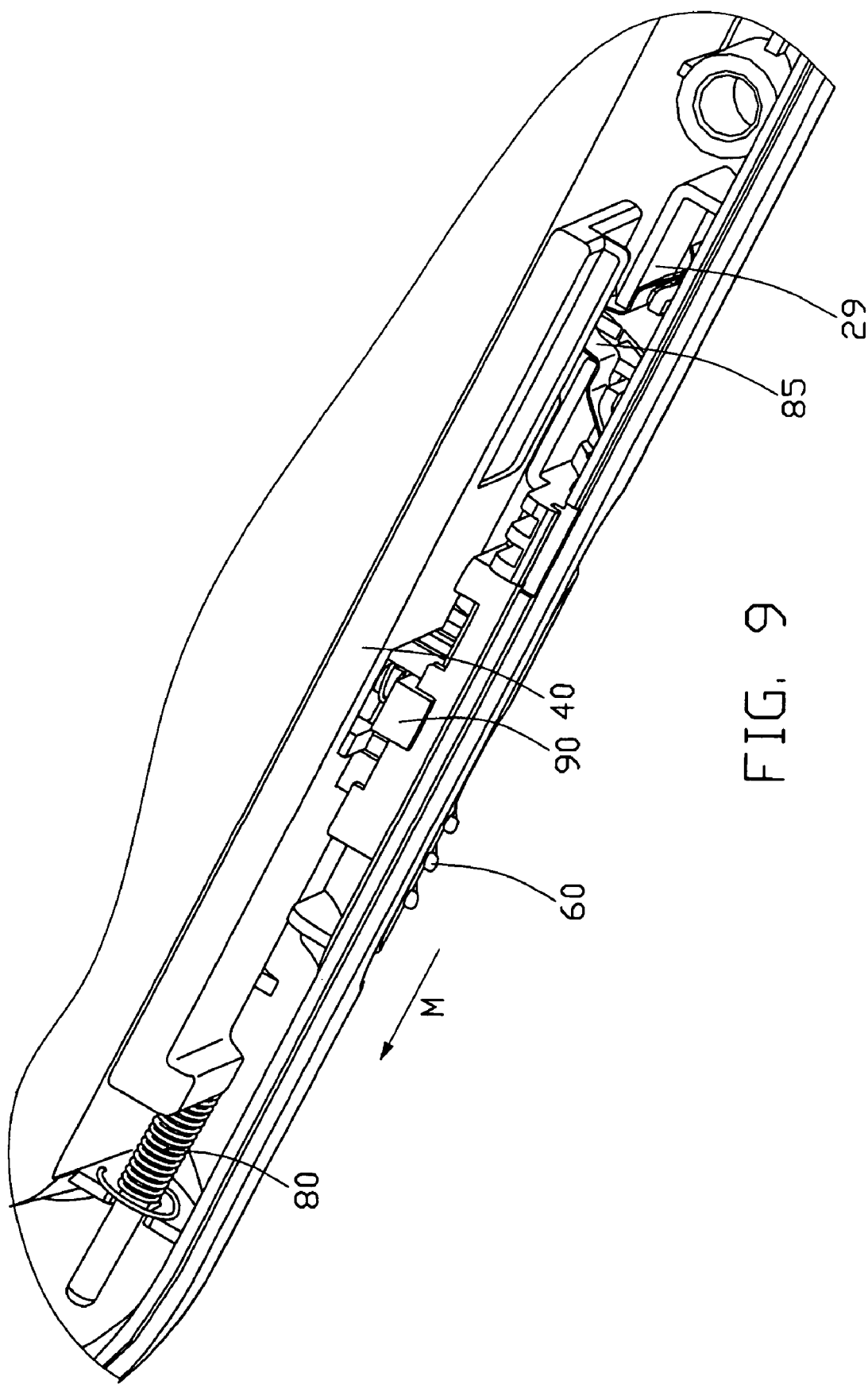
FIG. 9 is a partly view of the fully assembled view of FIG. 1, showing the locking apparatus when the battery is removed.
Figure 10:
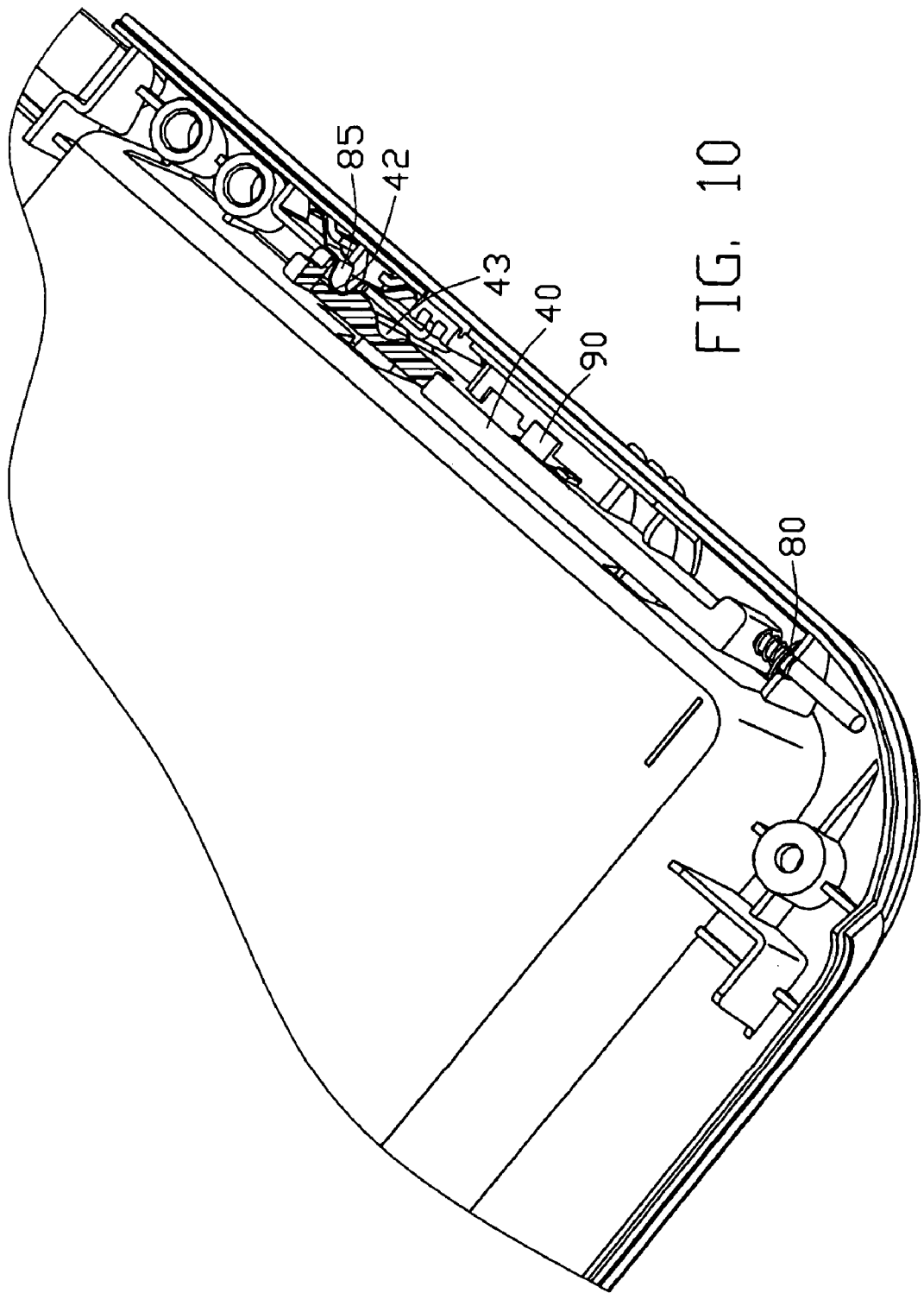
FIG. 10 is a partly sectional view of FIG. 9, but viewed from another aspect.

Referring to FIGS. 9-10, when the battery 10 is removed from the battery compartment 21, the button 90 is pressed inwardly and simultaneously the second lock member 60 is pushed in direction M. The second spring 100 is compressed, and the arm 93 of the button 90 is released from the second cutout 31 of the second plate 30. The first spring 80 is also compressed, and the combined first lock member 40, second lock member 60 and button 90 is moved in direction M until the stop portion 86 of the resilient member 85 rides over the protrusion 45 to engage in the second recess 42, so that the first lock member 40 is in an unlocked position. Simultaneously, the second posts 51 of the first lock member 40 are slid out of the lock portions 12 of the slots 11 of the battery 10, and slid out of the guide portions 13 along the slanted faces 14. Thus the battery 10 is removed from the base 20.

Figure 11:
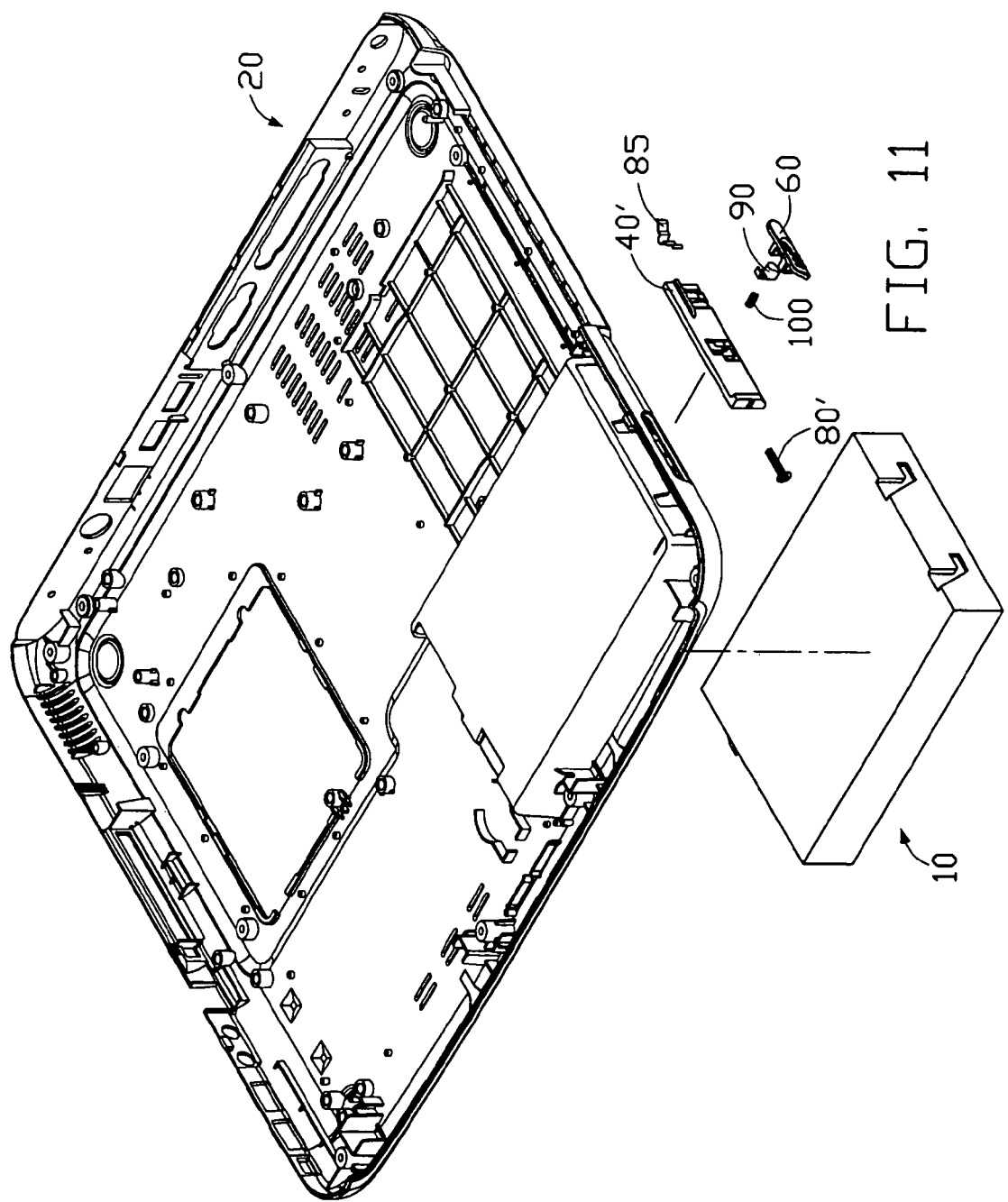
FIG. 11 is an exploded, isometric view of a battery locking apparatus for electronic apparatus in accordance with an alternative embodiment of the present invention.

FIG. 11 shows a battery locking apparatus in accordance with the alternative embodiment of the present invention. The locking apparatus comprises a battery 10, a base 20, a first lock member 40', a second lock member 60, a first spring 80', a resilient member 85, a button 90, and a second spring 100. The battery 10, base 20, second lock member 60, resilient member 85, button 90 and second spring 100 are the same as those of the locking apparatus of the preferred embodiment. The first lock member 40' is secured to the base 20. The first spring 80' is attached to the first lock member 40'.

Figure 12:
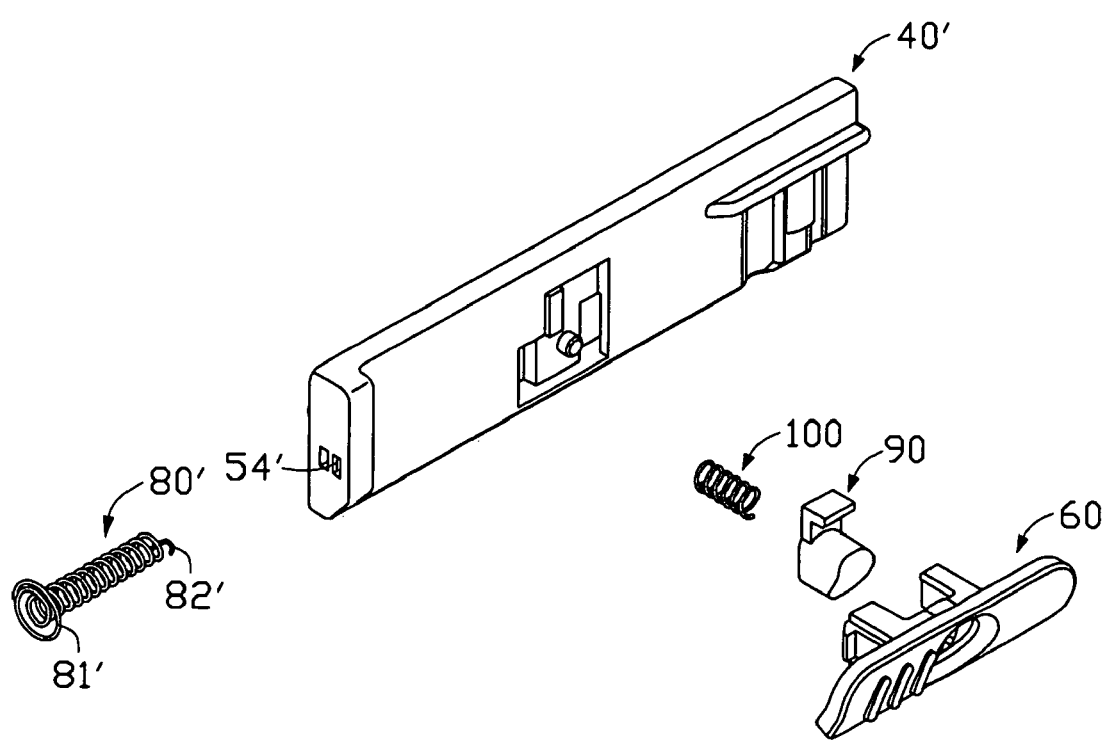
FIG. 12 is an exploded, isometric view of a first lock member and a second lock member of FIG. 11, together with a first spring, a second spring and a button.
Figure 13:
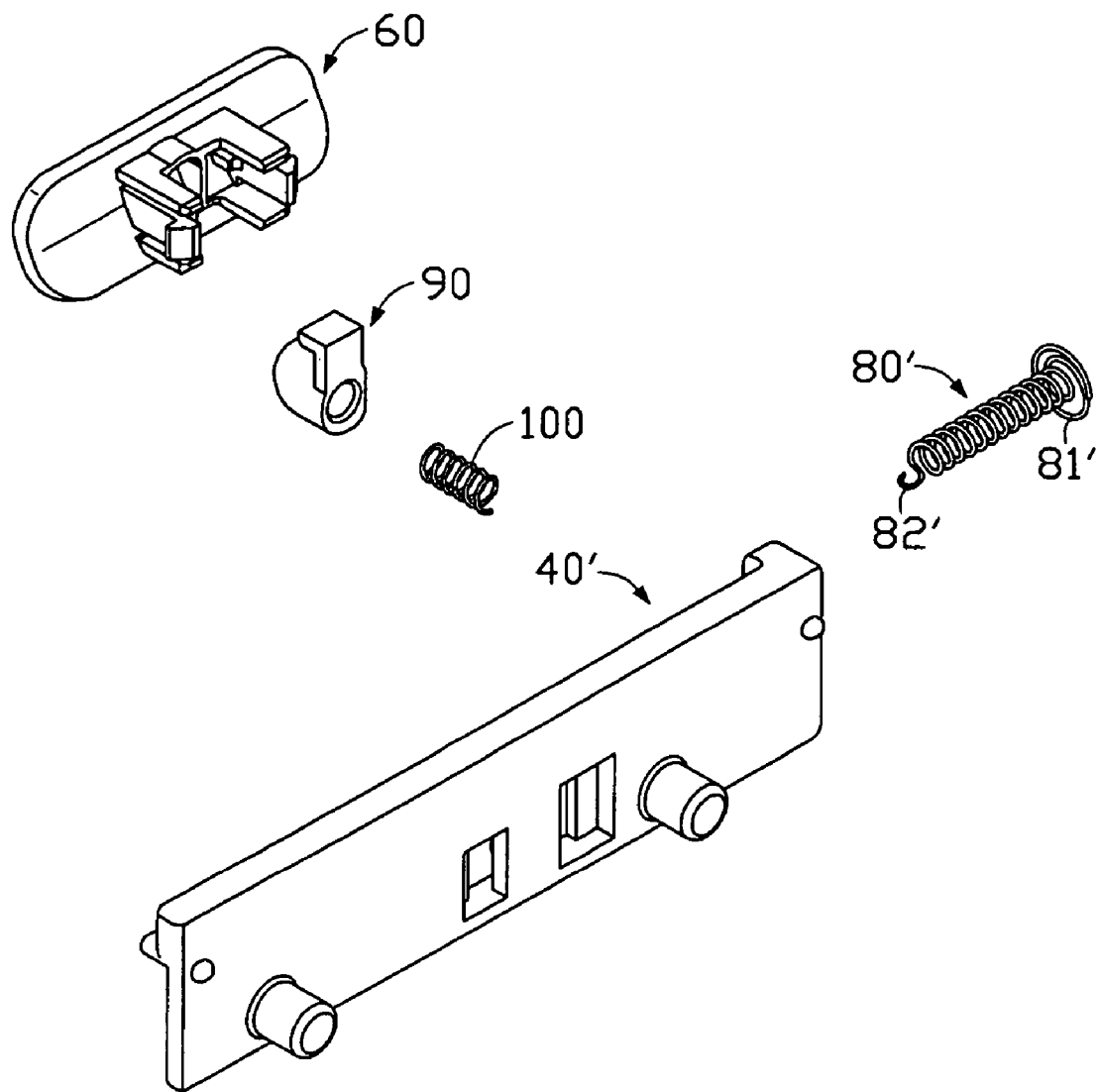
FIG. 13 is similar to FIG. 12, but viewed from another aspect.

Referring to FIGS. 12-13, the first lock member 40' is similar to the first lock member 40 of the preferred embodiment, except that the first lock member 40' defines a pair of holes 54' in an end thereof, instead of having the pin 41. Rear portions of the holes 54' are in communication with each other. The first spring 80' is similar to the first spring 80 of the preferred embodiment, except that the first spring 80' has a hook 82' at an end thereof. The first spring 80' comprises an enlarged portion 81' at an end thereof opposite from the hook 82'.

Figure 14:
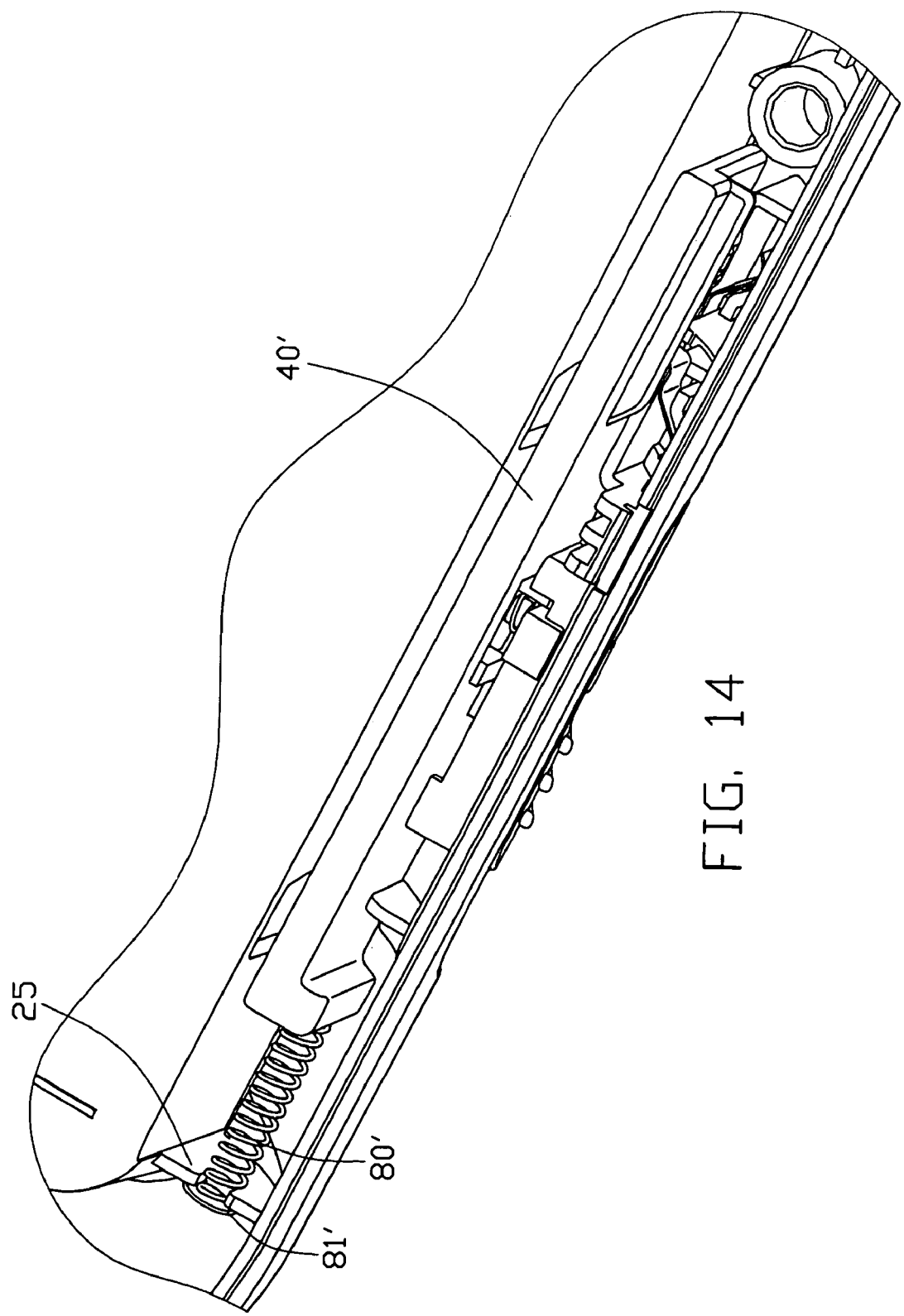
FIG. 14 is a partly view of the fully assembled view of FIG. 11, showing the locking apparatus when a battery is installed.

Referring to FIG. 14, in assembly, the enlarged portion 81' of the first lock member 80' abuts an outer face of a first plate 25 of the base 20, and the hook 82' engages in the holes 54' to attach the first spring 80' to the first lock member 40'. Subsequent assembly of the resilient member 85, the button 90, the combined first spring 80', first lock member 40', second spring 100 and second lock member 60, and the battery 10 to the base 20 is substantially the same as that described above in relation to the locking apparatus of the preferred embodiment.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A locking apparatus for a battery, the battery comprising at least one locking portion, the locking apparatus comprising: a base defining a cutout; a resilient member secured to the base, the resilient member comprising a stop portion; a first lock member secured to the base and engaged with the battery, the first lock member defining a first recess and a second recess, and comprising at least one post for engaging with the at least one locking portion of the battery, the first lock member being slidable between a first position and a second position; and a button attached to the base, the button comprising an arm; wherein when the first lock member is pushed in a first direction to the first position, the stop portion of the resilient member abuts the first lock member in the first recess, and the arm of the button is engagingly received in the cutout of the base, whereby the first lock member engages with the battery to secure the battery to the base; and when the button is pressed, the arm of the button is released from the cutout of the base, the first lock member can be slid in a second direction opposite to the first direction to the second position and the stop portion of the resilient member abuts the first lock member in the second recess, whereby the first lock member disengages from the battery to release the battery from the base.

2. The locking apparatus as claimed in claim 1, further comprising a first spring arranged between the base and the first lock member, whererin when the first lock member is in the first position, the first spring is in an original status, and when the first lock member is in the second position, the first spring is in a compressed status.

3. The locking apparatus as claimed in claim 2, further comprising a second spring arranged between the first lock member and the button, wherein when the arm of the button is receivingly engaged in the cutout of the base, the second spring is in an original status, and when the arm is released from the cutout, the second spring is in a compressed status.

4. The locking apparatus as claimed in claim 3, wherein the first lock member comprises a second post, the button defines a countersink, and the first post extends through the second spring and is received in the countersink.

5. The locking apparatus as claimed in claim 1, wherein the base comprises at least a flange, and a battery compartment is defined adjacent the flange for accommodating the battery therein.

6. The locking apparatus as claimed in claim 5, wherein the battery compartment defines a pair of spaced first through holes in a front wall thereof adjacent the flange and a second through hole in a rear wall thereof, the at least one post of the first lock member extends through the first through hole to be engagingly received in the at least one locking portion of the battery.

7. The locking apparatus as claimed in claim 6, wherein the first lock member comprises a pin extending from an end thereof, the base comprises a first plate between the battery compartment and the flange, the pin extends through the first spring and is received in the first cutout.

8. The locking apparatus as claimed in claim 7, wherein the first lock member further defines a first hole in one side thereof, and a second hole and a third hole adjacent the second hole in an opposite side thereof, the first, second and third holes are respectively bounded by a first, a second and a third bottom, a first gap and a second gap are defined between the first bottom and the second and third bottoms respectively.

9. The locking apparatus as claimed in claim 1, wherein the locking apparatus further comprises a second lock member engaged with the first lock member, the second lock member comprises a front panel, a pair of latches extends rearwardly from the second lock member, a pair of forks extends rearwardly from the second lock member substantially sandwiching the latches therebetween, the latches and the forks respectively extend through the first and second gaps of the first lock member, and the latches snappingly engage with the second and third bottoms of the first lock member.

10. The locking apparatus as claimed in claim 9, wherein the front panel of the second lock member defines a through hole, the button comprises a main body extending through the through hole of the front panel, and the countersink of the button is defined in the main body thereof.

11. The locking apparatus as claimed in claim 10, wherein the arm of the button perpendicularly extends from a rear end of the main body, the flange of the base defines an opening between the first holes of the battery compartment, a second plate extends rearwardly from the flange at an upper extremity of the opening, the second plate defines a second cutout, the main body of the button extends through the opening of the flange, and the arm of the button is engagingly received in the second cutout of the second plate.

12. The locking apparatus as claimed in claim 11, wherein the base further comprises a generally U-shaped third plate adjacent the second plate, the third plate defines a third cutout, a pair of fixing tabs extends rearwardly from the flange toward the third plate, a pair of shoulders extends from opposite ends of the stop portion of the resilient member, and a pair of slanted wings extends from distal ends of the shoulders, the stop portion extends through the third cutout of the third plate, the shoulders abut a main face of the third plate, and the wings abut respective fixing tabs of the base.

13. A battery locking assembly comprising: a battery; a base defining a battery compartment accomdating the battery therein; a resilient member secured to the base; a first lock member secured to the base and receivingly engaged with the battery, the first lock member being slidable between a locked position to engage with the battery thereby securely attaching the battery in the base and an unlocked position to release the battery from the base, wherein in said locked position and unlocked position the resilient member abuts the first lock member to retain the first lock member in position; a second lock member engaged with the first lock member, wherein the second lock member can be pushed in a first direction and an opposite second direction thereby causing the first lock member to be slid between said locked position and said unlocked position; and a button arranged between the first lock member and the second lock member, wherein when the first lock member is in said locked position, the button can be pressed so that the second lock member can be pushed in said second direction thereby causing the first lock member to be slid to said unlocked position.

14. The battery locking assembly as claimed in claim 13, further comprising a first spring arranged between the base and the first lock member, wherein when the first lock member is in the locked position, the first spring is in an original status, and when the first lock member is in the unlocked position, the first spring is in a compressed status.

15. The battery locking assembly as claimed in claim 13, further comprising a second spring, and the second spring is arranged between the first lock member and the button.

16. The battery locking assembly as claimed in claim 13, wherein the first lock member defines a first recess and a second recess, a stop is disposed above the first and second recesses, the resilient member comprises a stop portion, the stop portion engages in the first or the second recess to retain the first lock member in said locked position or said unlocked position, and the stop prevents the stop portion from being upwardly displaced.

17. The battery locking assembly as claimed in claim 16, wherein the battery compartment defines a pair of spaced first through holes in a front wall thereof and a second through hole in a rear wall thereof, the battery defines a pair of spaced slots in alignment with the first through holes of the battery compartment in a front wall thereof, and the battery comprises a projection extending from a rear wall thereof and engaging in the second through hole of the battery compartment.

18. The battery locking assembly as claimed in claim 17, wherein each of the slots of the battery comprises a guide portion and a lock portion, the guide portion is bounded by a slanted face, and the first lock member further comprises a pair of posts extending through the second through holes of the battery compartment to be engagingly received in the locking portions of the slots of the battery.

19. The battery locking assembly as claimed in claim 18, wherein the base comprises at least one flange, the first lock member comprises a pin extending from an end thereof, the base comprises a first plate between the battery compartment and the flange, the first plate defines a first cutout, and the pin of the first lock member extends through the first spring and is received in the first cutout.

* * * * *